United States Patent [19]

Bottomley

[11] Patent Number: 5,796,788
[45] Date of Patent: Aug. 18, 1998

[54] METHOD AND APPARATUS FOR INTERFERENCE DECORRELATION IN TIME AND SPACE

[75] Inventor: Gregory Edward Bottomley, Cary, N.C.

[73] Assignee: Ericsson Inc., Research Triangle Park, N.C.

[21] Appl. No.: 636,752

[22] Filed: Apr. 19, 1996

[51] Int. Cl.$^6$ .................................. H04B 7/10; H04L 1/02
[52] U.S. Cl. ........................ 375/341; 375/347; 375/349
[58] Field of Search .................................. 375/347, 262, 375/261, 37.7, 263, 348, 349, 340, 341, 202; 455/132, 133

[56] References Cited

U.S. PATENT DOCUMENTS

| | | |
|---|---|---|
| 4,644,562 | 2/1987 | Kavehrad et al. . |
| 4,713,817 | 12/1987 | Wei . |
| 4,992,798 | 2/1991 | Nozue et al. . |
| 5,031,193 | 7/1991 | Atkinson et al. . |
| 5,048,059 | 9/1991 | Dent . |
| 5,155,744 | 10/1992 | Ringelhaan . |
| 5,164,961 | 11/1992 | Gudmundson . |
| 5,191,598 | 3/1993 | Backstrom et al. . |
| 5,319,677 | 6/1994 | Kim . |
| 5,351,274 | 9/1994 | Chennakesu et al. . |
| 5,481,572 | 1/1996 | Skoid . |
| 5,659,578 | 8/1997 | Alamouti et al. ............ 375/261 |
| 5,680,419 | 10/1997 | Bottomley ................... 375/347 |
| 5,701,333 | 12/1997 | Okanoue et al. ............ 375/347 |

FOREIGN PATENT DOCUMENTS

| | | |
|---|---|---|
| 0 425 458A1 | 5/1991 | European Pat. Off. . |
| 430481 | 6/1991 | European Pat. Off. . |
| 449327 | 10/1991 | European Pat. Off. . |
| 54 3328A1 | 11/1992 | European Pat. Off. ........ H04B 7/000 |
| WO96/04738 | 2/1996 | WIPO . |

OTHER PUBLICATIONS

J.W. Modestino and V.M. Eyuboglu, "*Integrated Multielement Receiver Structures for Spatially Distributed Interference Channels,*" IEEE Trans. Info. Theory, vol. 32, pp. 195–219, Mar. 1986.

M. Stojanovic, J. Catipovic, and J.G. Proakis, "*Adaptive Multichannel Combining and Equalization for Underwater Acoustic Communications,*" J. Acoust. Soc. Am., vol. 94, pp. 1621–1631, Sep. 1993.

M. Stojanovic, J. Catipovic, and J.G. Proakis, "*Rduced-Complexity Spatial and Temporal Processing of Underwater Acoustic Communication Signals,*" J. Acoust. Soc. Am., vol. 98, pp. 961–972, Aug. 1995.

P. Vila, F. Pipon, D. Pirez and L. Fety, "*MLSE Antenna Diversity Equalization of a Jammed Frequency–Selective Fading Channel,*" Proc. EUSIPCO '94, Edinburgh, UK, pp. 1516–1519, Sep. 1994.

P. Jung, B. Steiner and Y. Ma, "*Maximum–Likelihood Detector for Coherent Receiver Antenna Diversity,*" Frequenz, vol. 48, pp. 94–99, 1994.

International Search Report re PCT/US97/06344 Date of mailing of search report: Aug. 8, 1997.

(List continued on next page.)

*Primary Examiner*—Stephen Chin
*Assistant Examiner*—Otto K. Chang
*Attorney, Agent, or Firm*—Burns, Doane, Swecker & Mathis, L.L.P.

[57] ABSTRACT

Receivers and methods for receiving transmitted symbols are disclosed in which techniques are applied to jointly combat fading, time dispersion, and interference that is correlated in both space and time. These objects are accomplished by, for example, providing an inverse impairment correlation sequence estimate to the branch metric processor in addition to a channel estimate. The branch metric processor can then use this additional information to provide branch metrics that take into account the time correlation of impairment to improve the symbol hypotheses.

19 Claims, 4 Drawing Sheets

OTHER PUBLICATIONS

J. Winters, "Signal Acquisition and Tracking with Adaptive Arrays in the Digital Mobile Radio System IS–54 with Flat Fading" *IEEE Transactions on Vehicular Technology*, vol. 42,No. 4, pp. 377–384 (Nov. 1993).

J. H. Winters, "Signal Acquisition And Tracking With Adaptive Arrays In the Digital Mobile Radio Systems IS–54 With Flat Fading", IEEE TRans. Veh. Technol., vol. 42, pp 377–384, Nov. 1993.

A.P. Clark and S. Hariharan, "Adaptive Channel Estimator For An HF Radio Link", IEEE Trans. Commun., vol. 37, pp. 918–926, Sep. 1989.

G.D'Aria, R. Piermarini and V. Zingarelli, "Fast Adaptive Equalizers For Narrow–Band TDMA Mobile Radio", IEEE Trans. Veh. Technol., vol. 40, pp. 392–404, May 1991.

Forney, "The Viterbi Algorithm", IEEE, vol. 61, pp. 286–296, Mar. 1973.

J. H. Winters, "Optimum Combining In Digital Mobile Radio With Cochannel Interference", IEEE J. Sel. Areas Commun., vol. SAC–2, pp. 528–539, Jul. 1984.

J. H. Winters, "Optimum Combining In Digital Mobile Radio With Cochannel Interference", Trans. Veh. Technol., vol. VT–33, pp. 144–155, Aug. 1984.

J. H. Winters, "On The Capacity Of Radio Communication Systems With Diversity In A Rayleigh Environment", IEEE J. Sel. Areas Commun., vol. SAC–5, pp. 871–878, Jun. 1987.

J. H. Winters, "Optimum Combining For Indoor Radio Systems With Multiple Users", IEEE Trans. Commun., vol. COM–35, pp. 1222–1230, Nov. 1987.

P. Balaban and J. Salz, "Dual Diversity And Equalization In Digital Cellular Mobile Radio", IEEE Trans. Veh. Technol., vol. 40, pp. 342–354, May 1991.

S.A. Hanna, M. El–Tanany, and S. A. Mahmoud, "An Adaptive Combiner For Co–Channel Interference Reduction In Multi–User Indoor Radio Systems", Proc. IEEE Veh. Technol. Conf., St. Louis, MO, May 19–22, 1991, pp. 222–227.

J. H. Winters, J. Salz,and R. D. Gitlin, "The Capacity Increases Of Wireless Communication Systems With Antenna Diversity", Proc. 1992 Conf. Inform. Sciences Syst., vol. II, Princeton, NJ, Mar. 18–20, 1992, pp. 853–858.

P. Balaban and J. Salz, "Optimum Diversity Combining And Equalization In Digital Data Transmission With Applications To Cellular Mobile Radio — Part I: Theoretical Considerations", IEEE Trans. Commun., vol. 40, pp. 885–894.

J. H. Winters, J. Salz, and R. D. Gitlin, "The Capacity Of Wireless Comunication Systems Can Be Substantially Increased By the Use Of Antenna Diversity", 1st Intl. Conf. on Universal Personal Communications (ICUPC '92), Sep. 29–Oct. 2, 1992, Dallas, TX, pp. 02.01.1–02.01.5.

M. V. Clark, L. J. Greenstein, W. K. Kennedy, and M. Shafi, "Optimum Linear Diversity Receivers In Digital Cellular Radio", Proc. Third International Symposium On Personal, Indoor, and Mobile Radio Communications, Boston MA, Oct. 19–21, 1992.

J. H. Winters, "Signal Acquisition And Tracking With Adaptive Arrays In Wireless Systems", Proc. 43rd IEEE Veh. Technol. Conf., Secaucus, NJ 1993, pp. 85–88.

J. H. Winters, J. Salz, and R. D. Gitlin, "The Impact Of Antenna Diversity On The Capacity Of Wireless Communication Systems", IEEE Trans. Commun., vol. 42, pp. 1740–1751, Feb/Mar/Apr 1994.

D. W. Tufts and A. A. Shah, "Rapid Interference Suppression And Channel Identification For Digital Multipath Wireless Channels", Proc. 44th IEEE Veh. Techol. Conf., Stockholm, Sweden, Jun. 7–10, 1994, pp. 1241–1245.

S. Simanapalli, "Adaptive Array Methods For Mobile Communications", Proc. 44th IEEE Veh. Technol. Conf., Stockholm, Sweden, Jun. 7–10, pp. 1503–1506.

W. H. Sheen and G. L. Stuber, "MLSE Equalization And Decoding For Multipath–Fading Channels", IEEE Trans. Commun. vol. 39, No. 10, Oct. 91.

Q. Liu and Y. Wan, "An Adaptive Maximum–Likelihood Sequence Estimation Receiver With Dual Diversity Combining/Selection", Int. Symp. On Personal, Indoor And Mobile Radio Commun., Boston, MA, pp. 245–249, Oct. 19–21, 1992.

Q. Liu and Y. Wan, "A Unified MLSE Detection Technique For TDMA Digital Cellular Radio", 43rd IEEE Vehicular Technology Conference, Secaucus, NJ, pp. 265–268, May 18–20, 1993.

P. Monsen, "Theoretical And Measured Performance Of A DFE Modem On A Fading Multipath Channel", IEEE Trans. Commun., vol. COM–25, pp. 1144–1153, Oct. 1977.

P. Monsen, "Feedback Equalization For Fading Dispersive Channels", IEEE Trans. Info. Theory, vol. IT–17, pp. 56–64, Jan. 1981.

P. Monsen, "MMSE Equalization Of Interference On Fading Diversity Channels", IEEE Trans. Commun. vol. COM–32, No. 1, pp. 5–12, Jan. 1984.

G. Ungerboeck, "Adaptive Maximum–Likelihood Receiver For Carrier–Modulated Data–Transmission Systems", IEEE Trans. Commun., vol. COM–22, pp. 624–635, May 1974.

W. Van Etten, "Maximum Likelihood Receiver For Multiple Channel Transmission Systems", IEEE Trans. Commun., vol. COM–24, pp. 276–283, Feb. 1976.

"Free From Sample Timing And Input Level Controls", Secaucus, NJ, May 18–20, 1993, no. Conf. 43, May 18, 1993, Institute of Electrical and Electronics Engineers, pp. 408–411, XP 000393208, Kazuhiro Okanoue et al.

N. W. K. Lo, D. D. Falconer and A. U. H. Sheikh, "Adaptive Equalization And Diversity Combining For A Mobile Radio Channel", Proc. IEEE Globecom '90, pp. 507A.1.1–507A.2.5, Dec. 1990.

N. W. K. Lo, D. D. Falconer and A. U. H. Skeikh, "Adaptive Equalization And Diversity Combining For Mobile Radio Using Interpolated Channel Estimates", IEEE Trans. Veh. Technol., vol. 40, pp. 636–645, Aug. 1991.

R. D. Koilpillai, S. Chennakeshu, and R. L. Toy, "Equalizer Performance With Diversity For U.S. Digital Cellular", Intl. Symp. on Personal, Indoor and Mobile Radio Commun., Boston, MA, pp. 255–259, Oct. 19–21, 1992.

B. Picinbono, "On Circularity", IEEE Trans. Sig. Proc., vol. 42, pp. 3473–3482, Dec. 1994.

G. E. Bottomley and K. Jamal, "Adaptive Arrays And MLSE Equalization", Proc. VTC '95, Chicago, IL, Jul. 1995, pp. 50–54.

Young C. Yoon and Harry Leib, "Matched Filtering In Improper Complex Noise and Application To DS–CDMA", IEEE publication No. 0–7803–3002–1/95, 1995, pp. 701–705.

W. Lee and Y. Yeu, "Polarization Diversity System For Mobile Radio", IEEE Transactions on Communications, COM-20(5), pp. 912–923, Oct. 1972.

S. Kozono, T. Tsuruhara, and M. Sakamotot, "Base Station Polarization Diversity Reception For Mobile Radio", IEEE Transactions on Vehicular Technology, 33(4), pp. 301–306, 1978.

A. Baier, G. Heinrich, and U. Wellens, "Bit Synchronization And Timing Sensitivity In Adaptive Viterbi Equalizers For Narrowband–TDMA Digital Mobile Radio Systems", Proc. VTC '88, Philadelphia, PA, pp. 377–384, 1988.

M. V. Clark, L. J. Greenstein, W. K. Kennedy, and M. Shafi, "Optimum Linear Diversity Receivers For Mobile Communications", IEEE Trans. Veh. Technol., vol. 43, pp. 47–56, Feb. 1994.

J. Salz and J. H. Winters, "Effect Of Fading Correlation On Adaptive Arrays In Digital Mobile Radio", IEEE Trans. Veh. Technol., vol. 43, pp. 1049–1057, Nov. 1994.

J. W. Modestino and V. M. Eyuboglu, "Integrated Multielement Receiver Structures For Spatially Distributed Interference Channels", IEEE Trans. On Info. Theory, vol. IT–32, pp. 195–219, Mar. 1986.

METHOD AND APPARATUS FOR INTERFERENCE DECORRELATION IN TIME AND SPACE

BACKGROUND

The present invention relates generally to the demodulation of a digital communications radio signal received by a plurality of antennas subjected to multipath fading, time dispersion, and interference.

Digital wireless communication systems are being deployed around the world to provide convenient, cost-effective communication services. One of the challenges in such systems is mitigating the effects of multipath propagation, which results when the transmitted signal travels along several paths to the intended receiver. When the path lengths are relatively small, the multiple signal images arrive at almost the same time. The images add either constructively or destructively, giving rise to fading, which typically has a Rayleigh distribution. When the path lengths are relatively large, the transmission medium is considered time dispersive, and the added images can be viewed as echoes of the transmitted signal, giving rise to intersymbol interference (ISI).

Fading can be mitigated by having multiple receive antennas and employing some form of diversity combining, such as selective combining, equal gain combining, or maximal ratio combining. Diversity takes advantage of the fact that the fading on the different antennas is not the same, so that when one antenna has a faded signal, chances are the other antenna does not.

ISI multipath time dispersion is traditionally mitigated by some form of equalization, such as linear equalization, decision feedback equalization, or maximum likelihood sequence estimation (MLSE). Of the three approaches, MLSE equalization provides superior performance. MLSE equalization and diversity combining can be performed jointly, as described, for example, in U.S. Pat. No. 5,191,598 to Bäckström et al.

Another challenge is the mitigation of interference. In a cellular communications system, a channel is reused in different cells. Signals propagate outside of their own cells and interfere with signals generated within other cells using the same channel. This form of interference, referred to as co-channel interference, limits performance at the receiver. Other forms of interference, such as adjacent-channel interference, are also a problem.

Interference can be mitigated by some form of array processing of the received signal. For example, when diversity combining multiple antenna signals, the combining weights can be adjusted to cancel interference as well as coherently combine signal energy. See, for example, J. H. Winters, "Signal Acquisition and Tracking with Adaptive Arrays in the Digital Mobile Radio System IS-54 with Flat Fading," IEEE Transactions on Vehicular Technology, Vol. 42, pp. 377–384, Nov. 1993.

Mitigation of fading, time dispersion, and interference can be performed jointly by modifying the MLSE metric to incorporate an inverse impairment correlation matrix. See, for example, U.S. patent application Ser. No. 08/284,775 entitled "METHOD OF AND APPARATUS FOR INTERFERENCE REJECTION COMBINING IN MULTI-ANTENNA DIGITAL CELLULAR COMMUNICATIONS SYSTEMS", filed on Aug. 2, 1994, to Bottomley, the disclosure of which is expressly incorporated here by reference, as well as G. E. Bottomley and K. Jamal, "Adaptive Arrays and MLSE Equalization," Proc. VTC '95, Chicago, Ill., July 1995. The inverse impairment correlation matrix spatially decorrelates the impairment estimates when forming branch metrics in the MLSE equalization process. This technique is referred to as interference rejection combining (IRC).

However, it is possible that the antenna impairment signals are correlated in time as well as space. This can result from using a modulation that has memory, such as partial response modulation or CPM schemes. It can also result from multipath time dispersion of the interference, so that echoes of the interference signal are present. The previously described techniques are not optimal for time correlated interference. Thus, there is a need for a technique which better handles fading, ISI, and time-correlated interference.

SUMMARY

The present invention solves the aforementioned problem by jointly combatting fading, time dispersion, and interference that is correlated in both space and time. These objects are accomplished by, for example, providing an inverse impairment correlation sequence estimate to the branch metric processor in addition to a channel estimate. The branch metric processor can then use this additional information to provide branch metrics that take into account the time correlation of impairment to improve the symbol hypotheses.

BRIEF DESCRIPTION OF THE DRAWINGS

These, and other, objects, features and advantages of the present invention will be understood after reading the following detailed description, in conjunction with the drawings, in which.

DETAILED DESCRIPTION

Figure 1:
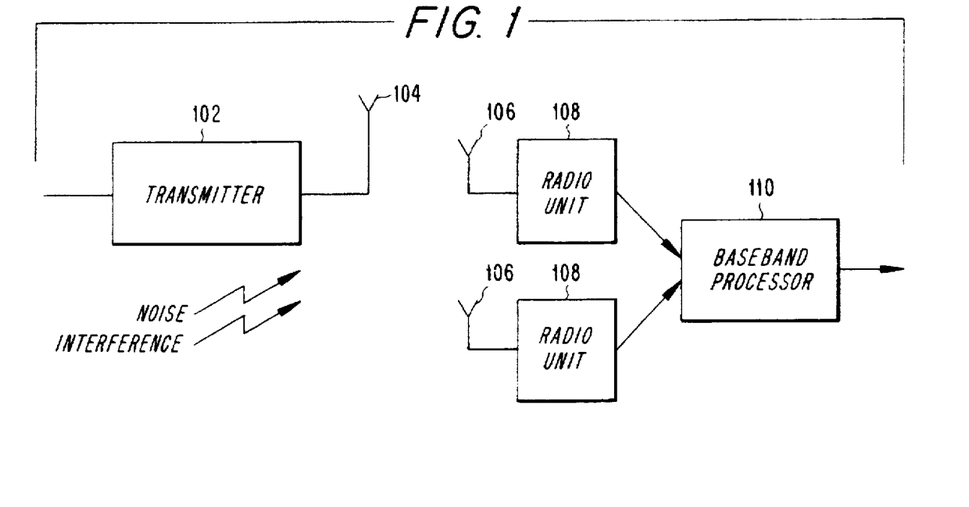
FIG. 1 is a block diagram of an exemplary digital wireless communication system.

Shown in FIG. 1 is a block diagram of an exemplary wireless communication system. Digital information symbols, denoted s(n), are passed to a transmitter 102, which converts the symbol stream to a radio waveform for transmission using antenna 104. The transmitted signal is received by a plurality of receive antenna elements 106. Each antenna signal is processed by a radio unit 108, which filters, amplifies, mixes, and samples the signal appropriately, giving rise to a sequence of received samples. These received samples are processed in baseband processor 110 to produce a sequence of detected digital symbol values.

With the aforementioned IRC approach, the baseband processor 110 would work as follows. Let $r_a(n)$ and $r_b(n)$ denote the received sample streams on antennas a and b respectively. Each sample stream can be modeled as:

$$r_x(n) = \sum_j c_x(j)s(n-j) + z_x(n) \quad (1)$$

where the subscript x denotes the antenna, $c_x(j)$ is the j'th channel tap associated with the desired signal and antenna x, and $z_x(n)$ denotes the impairment (noise plus other signal interference). Typically, in-phase (I) and quadrature (Q) components of the received signals are treated as single, complex samples, so that the received samples, the channel taps, the impairment samples, and possibly the information symbol values are complex numbers.

The baseband processor would form metrics of the form:

$$M_h(n) = E_h^H(n)\hat{R}_{zz}^{-1}E_h(n) \quad (2)$$

where $$E_h(n) = \begin{bmatrix} e_{a,h}(n) \\ e_{b,h}(n) \end{bmatrix} \quad (3)$$

$$e_{x,h}(n) = r_x(n) - \sum_j \hat{c}_x(j)s_h(n-j) \quad (4)$$

where subscript h denotes hypothesized values, $\hat{c}_x(j)$ denotes a channel coefficient estimate, and $\hat{R}_{zz}$ denotes an estimate of the inverse impairment correlation matrix. The impairment correlation matrix is defined to be:

$$R_{zz} = E\left\{ \begin{bmatrix} Z_a(n) \\ Z_b(n) \end{bmatrix} [Z_a^*(n) \ Z_b^*(n)] \right\} \quad (5)$$

where E{ } denotes expected value. The detected symbol sequence is then one that minimizes an accumulation of branch metrics.

According to the present invention, on the other hand, time correlation of the impairment is also considered. Correlation in both time and space can be represented by an impairment correlation matrix sequence, for example:

$$R_{zz}(m) = E\left\{ \begin{bmatrix} z_a(n+m) \\ z_b(n+m) \end{bmatrix} [z_a^*(n) \ z_b^*(n)] \right\} \quad (6)$$

where m is the sequence index. The index m represents a time difference between the two impairment valves being correlated. Thus, the impairment correlation matrix sequence provides an additional term (i.e., representing time correlation of the impairment) for each matrix entry. An inverse impairment correlation matrix sequence can be defined so that:

$$R_{zz}^{-1}(m)*R_{zz}(m) = \delta(m)I \quad (7)$$

where $\delta(m)$ is the Kronecker delta function (i.e., $\delta(0)=1$ but for all other values of m, $\delta(m)=0$), and I is the identity matrix (i.e., 1's on the diagonal, 0's on the off diagonal).

With the inverse impairment correlation matrix sequence defined, the branch metric according to the present invention is given by:

$$M_h(n) = \sum_m E_h^H(n)\hat{R}_{zz}^{-1}(m)E_h(n-m) \quad (8)$$

which is the sum of quadratic products.

Figure 2:
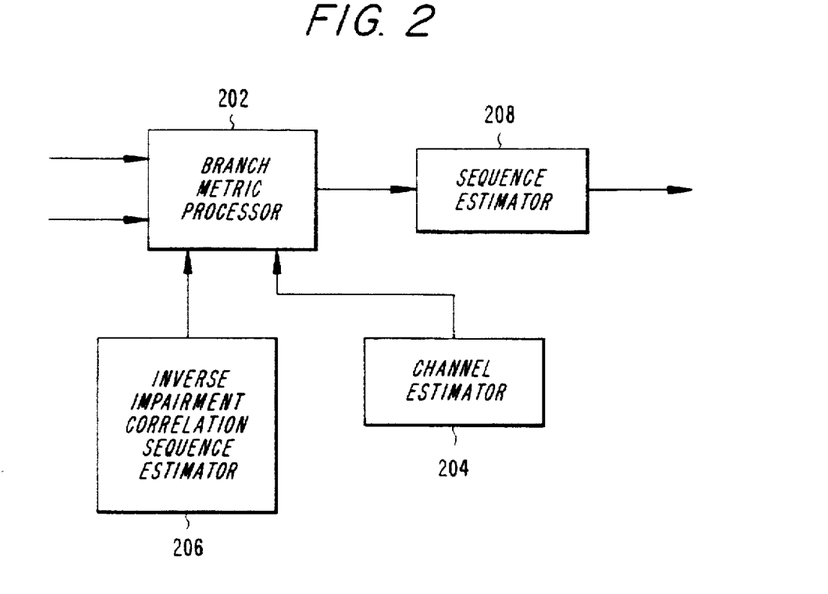
FIG. 2 illustrates an exemplary embodiment of a baseband processor according to the present invention.

This exemplary embodiment of the present invention is illustrated in FIG. 2. Received samples are processed by a branch metric processor 202 to produce branch metrics according to symbol hypotheses. The processor 202 uses channel coefficient estimates from channel estimator 204 as well as an inverse impairment correlation sequence estimate from inverse impairment correlation sequence estimator 206.

Figure 3:
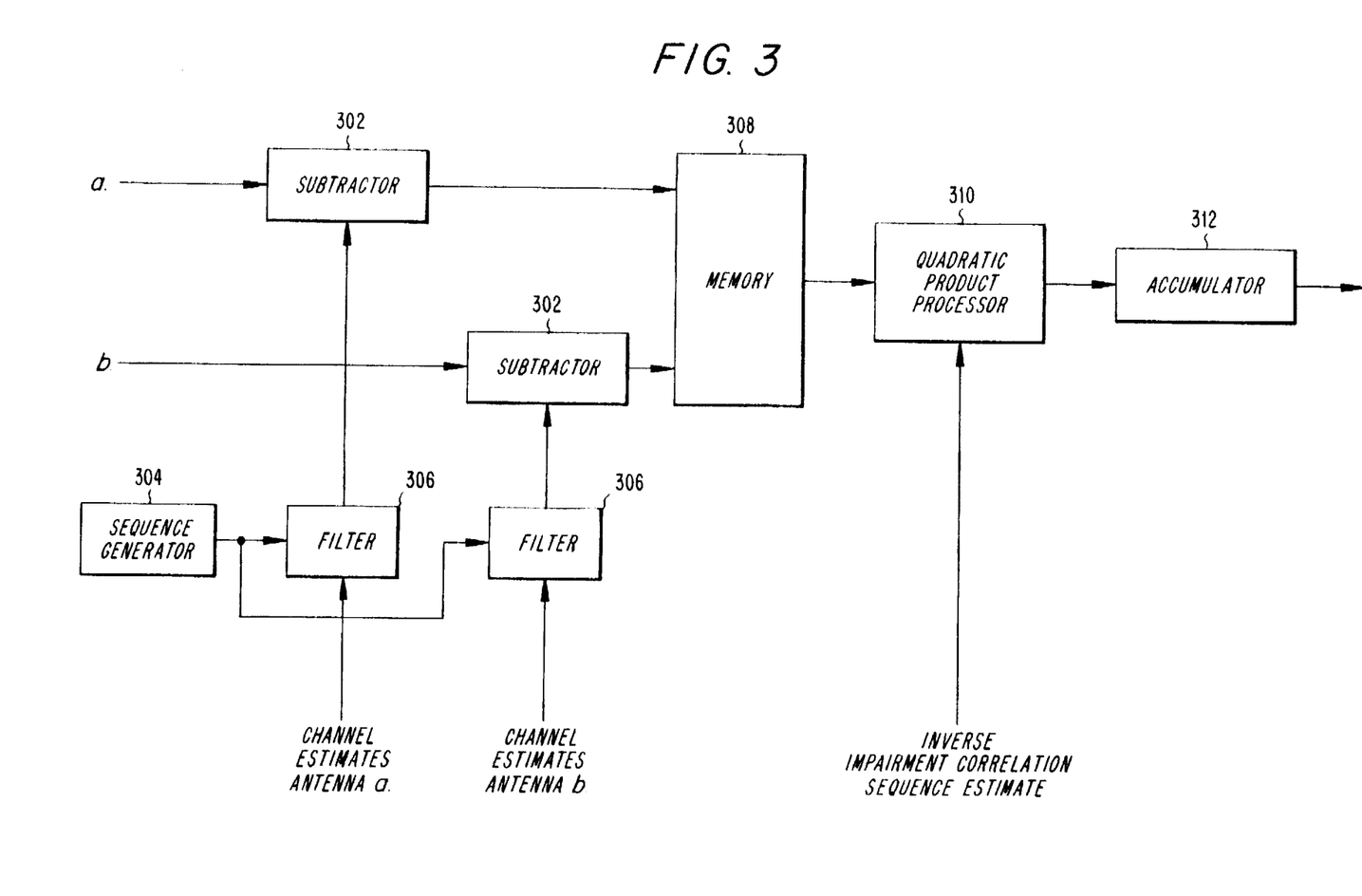
FIG. 3 illustrates an exemplary embodiment of a branch metric processor according to the present invention.

An exemplary embodiment of the branch metric processor 202 is given in FIG. 3. Received samples are provided to subtractors 302, which subtract hypothetical received samples from actual received samples, forming difference signals. The hypothetical received samples are obtained by producing a hypothetical symbol sequence with sequence generator 304 and filtering the sequence with channel coefficient estimates in filters 306. The difference signals are stored in memory 308. Quadratic product processor 310 forms quadratic products between the stored difference signals using a matrix in the inverse impairment correlation sequence estimate. These quadratic products are accumulated in accumulator 312 to produce branch metrics.

An alternative embodiment of the present invention can be obtained by rewriting the final metric as a sum of new branch metrics given by:

$$M_h(n) = Re\left\{ s_h^*(n)\left[ z(n) - 0.5S(0)s_h(n) - \sum_{k,k>0} S(k)s_h(n-k) \right] \right\} \quad (9)$$

where $$z(n) = \sum_j \sum_m \hat{C}^H(j)\hat{R}_{zz}^{-1}(m)R(n+j-m) = \sum_j \sum_m W^H(j,m)R(n+j-m) \quad (10)$$

$$S(k) = \sum_j \sum_m \hat{C}^H(j)\hat{R}_{zz}^{-1}(m)\hat{C}(k+j-m) \quad (11)$$

and $$\hat{C}(j) = \begin{bmatrix} c_a(j) \\ c_b(j) \end{bmatrix}, \quad R(n) = \begin{bmatrix} r_a(n) \\ r_b(n) \end{bmatrix}, \quad W(j,m) = \hat{R}_{zz}^{-1}(m)\hat{C}(j) \quad (12)$$

Thus, the metric in equation (9) is the real part of multiplying the conjugate of the current hypothetical symbol with the difference between two terms. The first term is the result of combining the received data with weights $W(j,m)$. The second term is the result of filtering the hypothetical symbols with parameters $S(k)$. If all possible symbol values have the same magnitude, then the $S(0)$ term can be omitted.

Figure 4:
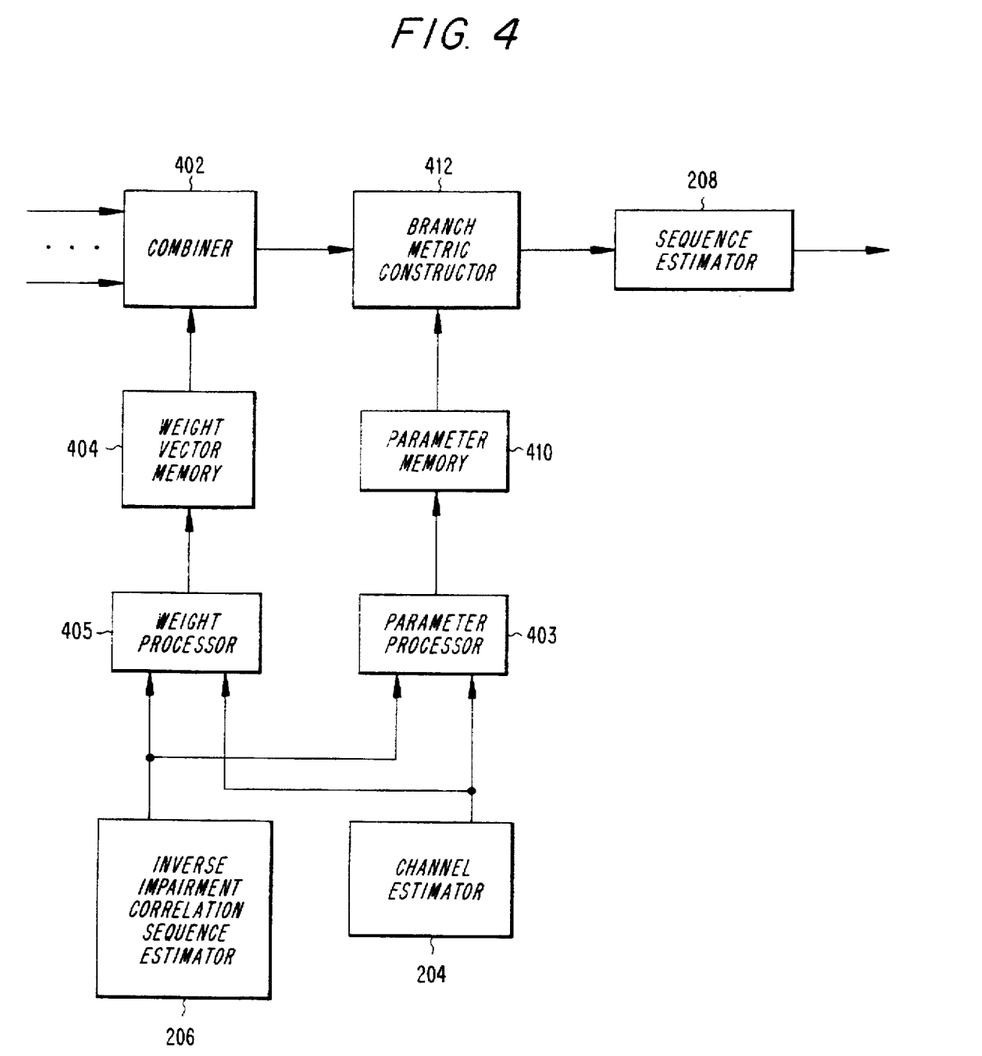
FIG. 4 illustrates an alternative embodiment of a baseband processor according to the present invention.

This alternative embodiment is illustrated in FIG. 4. The received samples are combined in combiner 402 using weights stored in weight vector memory 404 to produce combined terms. The weights are computed in weight processor 405, which uses the inverse impairment correlation sequence estimate and channel coefficient estimates provided by inverse impairment correlation sequence estimator 206 and channel estimator 204, respectively. These estimates are also used in parameter processor 403, which computes parameters that are stored in parameter memory 410. The combined terms and parameters are provided to branch metric constructor 412, which constructs branch metrics according to various symbol hypotheses. These branch metrics are provided to sequence estimator 208, which estimates the transmitted sequence.

Figure 5:
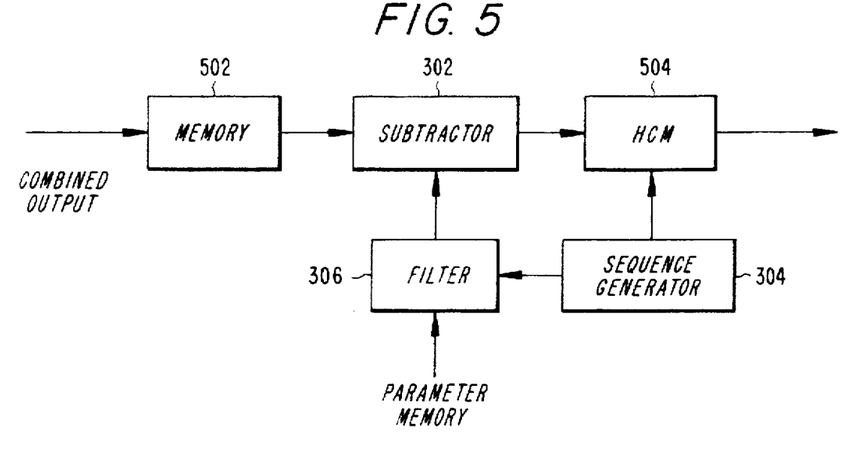
FIG. 5 illustrates an exemplary embodiment of a branch metric constructor according to the present invention.

An exemplary embodiment of the branch metric constructor 412 is shown in FIG. 5. Combined outputs are stored in memory 502. Combined outputs are then read from memory 502 and provided to subtractor 302, which subtracts outputs of filter 306 to produce differences. The output of filter 306 is the result of filtering hypothetical symbol values from sequence generator 304 with parameters from the parameter memory. Real parts of the products of differences and hypothetical symbol values are computed in half-complex-multiplier (HCM) 504. The outputs of HCM 504 are branch metrics.

Figure 6:
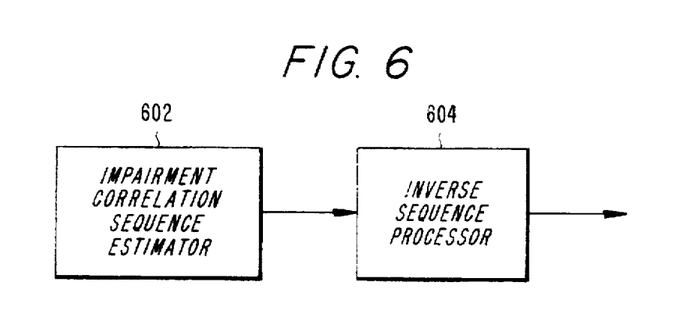
FIG. 6 illustrates an exemplary embodiment of an inverse impairment correlation sequence estimator according to the present invention.

All of these exemplary embodiments make use of inverse impairment correlation sequence estimator 206. One procedure for determining the inverse impairment correlation sequence is to take the z-transform of the impairment correlation matrix sequence and represent the transformed result as a single matrix in which each element is a sequence in z. Then, a regular matrix inverse can be taken, followed by an inverse z-transform. This procedure is illustrated in FIG. 6. The impairment correlation sequence is estimated in estimator 602. Similar to the Bottomley patent, this can be done by removing the desired signal from the received signal samples, giving impairment samples, which can be correlated in time and space. The impairment correlation sequence estimate is then provided to inverse sequence processor 604, which computes the inverse according to the aforementioned procedure.

In practice, it may be desirable to approximate the inversion operation in 604. This can be done by forming the adjoint of the z-transformed matrix, then scaling each element by a scaling factor, prior to an inverse z-transform operation. When the scaling factor is the determinant of the z-transformed matrix, then there is no loss in optimality. Other choices for the scaling factor would be unity (i.e., no scaling needed), the determinant of $R_{zz}(0)$, or the trace of $R_{zz}(0)$.

Figure 7:
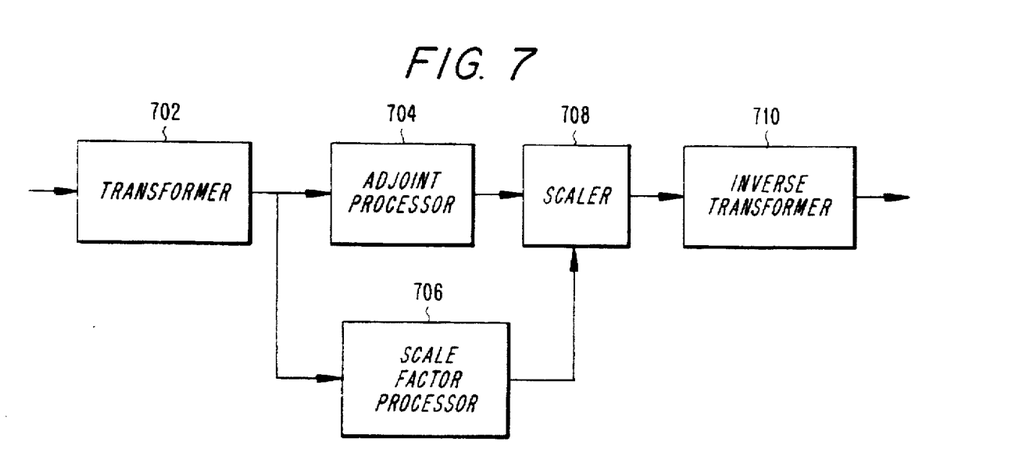
FIG. 7 illustrates an exemplary embodiment of an inverse sequence computer according to the present invention.

This suggests the exemplary embodiment of inverse sequence processor 604 shown in FIG. 7. The impairment correlation matrix sequence is z-transformed in transformer 702, producing a transformed matrix, in which each element is a series of values. The adjoint of the transformed matrix is computed by adjoint processor 704. Each element of the adjoint is scaled by scaler 708, which uses a scaling factor determined by scale factor processor 706. The scaled adjoint is inverse transformed in inverse transformer 710 to produce an estimate of the inverse correlation impairment sequence. In practice, it may be more efficient to perform the scaling operation at another point in the branch metric formation process.

While not shown, it will be known to persons skilled in the art how the present invention can be applied when there are more than two antennas. Also, the present invention can be applied to other types of receive channels, not just those associated with different antennas. Fractionally-spaced equalization can be handled by treating each fractionally-sampled data stream as interleaved, symbol-spaced data streams coming from different antennas.

The estimators in the present invention may be designed to adapt to changes over time. It will be known to persons skilled in the art how to adaptively estimate the channel coefficients and the inverse impairment correlation sequence. One approach is to use decision feedback, with tentatively detected symbol values. Another approach is to use per-survivor processing, so that there are one or more estimates per state in the sequence estimator.

When quantities do not change with time or do not change in a block of time, then all quantities unrelated to the received data samples can be pre-computed. For example, for the metric in equation (9), all quantities except the combined values z(n) can be precomputed.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. In a digital wireless communication system for conveying digital information symbols, a receiver comprising:
    means for receiving a radio signal on a plurality of antennas to produce a plurality of antenna signals;
    means for radio processing said antenna signals to produce a plurality of received sample streams;
    means for forming a plurality of channel coefficient estimates corresponding to each of said received sample streams;
    means for forming an inverse impairment correlation sequence estimate in which impairment corresponds to interference and noise among the received sample streams;
    means for forming branch metrics using said channel coefficient estimates and said inverse impairment correlation sequence estimate; and
    means for detecting said digital information symbols using said branch metrics in a sequence estimator.

2. A receiver according to claim 1 in which said means for forming branch metrics further comprises:
    means for forming hypothetical received samples using said channel coefficient estimates;
    means for forming differences between said received samples and said hypothetical received samples;
    means for storing said differences in a memory device;
    means for forming quadratic products with said stored differences using said inverse impairment correlation sequence estimate; and
    means for accumulating said quadratic products to produce said branch metrics.

3. A receiver according to claim 1 in which said means for forming branch metrics further comprises:
    means for forming weights using said channel coefficient estimates and said inverse impairment correlation sequence estimate;
    means for forming parameters using said channel coefficient estimates and said inverse impairment correlation sequence estimate;
    means for combining said weights with said received samples to produce combined values;
    means for filtering hypothetical symbol values with said parameters to produce filtered values; and
    means for combining said combined values, said filtered values, and a hypothetical symbol value to produce branch metrics.

4. A receiver according to claim 1 in which said means for estimating an inverse impairment correlation sequence further comprises:
    means for estimating an impairment correlation sequence;
    means for transforming said sequence to produce a transformed matrix;
    means for computing the inverse of said transformed matrix; and
    means for inverse transforming said inverse of said transformed matrix.

5. A receiver according to claim 1 in which said means for estimating an inverse impairment correlation sequence further comprises:
    means for estimating an impairment correlation sequence;
    means for transforming said sequence to produce a transformed matrix;
    means for computing the adjoint of said transformed matrix; and
    means for inverse transforming said adjoint of said transformed matrix.

6. A receiver according to claim 1 in which said means for estimating an inverse impairment correlation sequence further comprises:

means for estimating an impairment correlation sequence;

means for transforming said sequence to produce a transformed matrix;

means for computing the adjoint of said transformed matrix;

means for computing a scale factor;

means for scaling said adjoint to produce a scaled adjoint; and means for inverse transforming said scaled adjoint.

7. The receiver of claim 1, wherein said means for forming an inverse impairment correlation sequence estimate uses an impairment correlation matrix sequence which comprises a plurality of impairment correlation matrices.

8. The receiver of claim 7, wherein said plurality of correlation matrices correspond to different time differences between impairment values being correlated.

9. A method for detecting information symbols comprising the steps of:

receiving a radio signal on a plurality of antennas to produce a plurality of antenna signals;

radio processing said antenna signals to produce a plurality of received sample streams;

forming a plurality of channel coefficient estimates corresponding to each of said received sample streams;

forming an inverse impairment correlation sequence estimate in which impairment corresponds to interference and noise among the received sample streams;

forming branch metrics using said channel coefficient estimates and said inverse impairment correlation sequence estimate; and detecting said digital information symbols using said branch metrics in a sequence estimator.

10. The method according to claim 9 which said step of forming branch metrics further comprises the steps of:

forming hypothetical received samples using said channel coefficient estimates;

forming differences between said received samples and said hypothetical received samples;

storing said differences in a memory device;

forming quadratic products with said stored differences using said inverse impairment correlation sequence estimate; and accumulating said quadratic products to produce said branch metrics.

11. The method of claim 9 in which said step of forming branch metrics further comprises the steps of:

forming weights using said channel coefficient estimates and said inverse impairment correlation sequence estimate;

forming parameters using said channel coefficient estimates and said inverse impairment correlation sequence estimate;

combining said weights with said received samples to produce combined values;

filtering hypothetical symbol values with said parameters to produce filtered values; and combining said combined values, said filtered values, and a hypothetical symbol value to produce branch metrics.

12. The method according to claim 9 in which said step of estimating an inverse impairment correlation sequence further comprises the steps of:

estimating an impairment correlation sequence;

transforming said sequence to produce a transformed matrix;

computing the inverse of said transformed matrix; and inverse transforming said inverse of said transformed matrix.

13. A receiver according to claim 9 in which said step of estimating an inverse impairment correlation sequence further comprises the steps of:

estimating an impairment correlation sequence;

transforming said sequence to produce a transformed matrix;

computing the adjoint of said transformed matrix; and inverse transforming said adjoint of said transformed matrix.

14. The method of claim 9 in which said step of estimating an inverse impairment correlation sequence further comprises the steps of:

estimating an impairment correlation sequence;

transforming said sequence to produce a transformed matrix;

computing the adjoint of said transformed matrix;

computing a scale factor;

scaling said adjoint to produce a scaled adjoint; and inverse transforming said scaled adjoint.

15. The method of claim 9, wherein said step of forming an inverse impairment correlation sequence estimate further comprises the step of:

using an impairment correlation matrix sequence which comprises a plurality of impairment correlation matrices.

16. The method of claim 15, wherein said plurality of correlation matrices correspond to different time differences between impairment values being correlated.

17. A receiver comprising:

at least two antennas each for receiving a radio signal to produce at least two antenna signals; and a processor for receiving said at least two antenna signals and processing said at least two antenna signals to determine information symbols present in said radio signal, wherein said processor includes:

means for determining branch metrics, which branch metrics are used to form hypotheses of said information symbols, wherein said branch metrics are determined taking into account both space and time impairment correlation.

18. The receiver of claim 17, wherein said means for determining branch metrics further comprises:

means for forming an inverse impairment correlation sequence estimate which comprises a plurality of impairment correlation matrices.

19. The receiver of claim 18, wherein said plurality of correlation matrices correspond to different time differences between impairment values being correlated.

* * * * *